United States Patent [19]

Berger

[11] Patent Number: 4,933,813
[45] Date of Patent: Jun. 12, 1990

[54] SUNLIGHT SIMULATOR

[76] Inventor: Daniel S. Berger, 6655 Lawnton Ave., Philadelphia, Pa. 19126

[21] Appl. No.: 368,871

[22] Filed: Jul. 27, 1987

Related U.S. Application Data

[63] Continuation-in-part of Ser. No. 851,638, Apr. 14, 1986, abandoned.

[51] Int. Cl.⁵ ............................................. F21V 7/04
[52] U.S. Cl. ......................................... 362/2; 362/32; 362/268; 362/281
[58] Field of Search ................ 362/1, 2, 32, 263, 268, 362/277, 293, 296, 317, 351, 354, 360, 281

[56] References Cited

U.S. PATENT DOCUMENTS

| | | | |
|---|---|---|---|
| 247,229 | 9/1881 | Wheeler | 362/32 |
| 1,277,089 | 8/1918 | Littlefield | 362/283 |
| 1,403,139 | 1/1922 | Verain | 362/308 |
| 1,454,218 | 5/1923 | Folmer | 354/110 |
| 2,108,055 | 2/1938 | Eitzen | 353/49 |
| 2,198,014 | 4/1940 | Ott | 362/303 |
| 2,206,521 | 7/1940 | Van Den Akker et al. | 356/310 |
| 2,233,062 | 2/1941 | Pineo | 356/333 |
| 2,236,420 | 3/1941 | Bergmans et al. | 362/237 |
| 2,281,545 | 5/1942 | Bennett et al. | 356/413 |
| 2,561,774 | 7/1951 | Back | 350/622 |
| 2,973,683 | 3/1961 | Rowe et al. | 350/174 |
| 3,020,887 | 2/1962 | Hobson et al. | 92/26 |
| 3,068,739 | 12/1962 | Hicks et al. | 362/32 |
| 3,107,296 | 10/1963 | Hine | 250/494.1 |
| 3,122,602 | 2/1964 | Page | 350/525 |
| 3,200,253 | 8/1965 | Geier | 250/493.1 |
| 3,211,910 | 10/1965 | Anderson | 250/493.1 |
| 3,296,923 | 1/1967 | Miles | 353/38 |
| 3,321,620 | 5/1967 | Miles et al. | 362/1 |
| 3,325,238 | 6/1967 | Geier | 350/505 |
| 3,388,314 | 6/1968 | Gould | 250/493.1 |
| 3,457,401 | 7/1969 | Hoekstra | 362/263 |
| 3,551,671 | 12/1970 | Rouberol | 250/399 |
| 3,742,219 | 6/1973 | Damm et al. | 250/251 |
| 3,766,427 | 10/1973 | Coates et al. | 315/382 |
| 3,826,996 | 7/1974 | Jaegle et al. | 372/5 |
| 3,848,119 | 11/1974 | Masson et al. | 362/33 |
| 4,206,494 | 6/1980 | Lovering | 362/32 |
| 4,423,469 | 12/1983 | Zerlaut et al. | 362/2 |
| 4,428,035 | 1/1984 | Muller et al. | 362/224 |
| 4,459,643 | 7/1984 | Mori | 362/32 |
| 4,497,013 | 1/1985 | Ohta | 362/32 |

Primary Examiner—David A. Okonsky
Attorney, Agent, or Firm—Seidel, Gonda, Lavorgna & Monaco

[57] ABSTRACT

A sunlight simulator includes an elongated, cylindrical housing, an artifical light source disposed along the longitudinal axis thereof, and a plurality of light collecting subassemblies equidistantly spaced radially from and around the light source. The light source is of a type that emits a substantial amount of radiation in the UV portion of the spectrum. The light collecting subassemblies provide a plurality of individually and selectively adjustable beams of UV radiation. A plurality of light guides are provided for directing the radiation to desired locations.

19 Claims, 6 Drawing Sheets

SUNLIGHT SIMULATOR

This is a continuation-in-part of co-pending application Ser. No. 851,638 filed on Apr. 14, 1986, now abandoned.

BACKGROUND OF THE INVENTION

The present invention is directed to an apparatus for simulating the ultraviolet ("UV") portion of the sunlight spectrum and, in particular, is for use in sunburning studies. The apparatus includes means for providing multiple beams of UV radiation from a single source whereby the intensity of each beam is individually and selectively adjustable.

Exposure to UV radiation is a leading cause of adverse skin conditions, including skin cancers. Exposure is usually from sunlight. Apparatus for testing skin reaction to various UV intensities is, therefore, desirable to obtain empirical data. Generally, known apparatus include an artificial light source that provides a single beam focused upon the subject. It is desirable, however, to have the ability to simultaneously test skin reaction to various intensities of UV radiation. The present invention is directed to an apparatus that provides such function.

SUMMARY OF THE INVENTION

A sunlight simulator generally comprises an elongated cylindrical housing having disposed therein an axially aligned artificial light source and plural light collecting subassemblies equidistantly spaced radially from and around the light source. The light source is preferably of a high intensity type that emits a substantial amount of radiation in the UV portion of the spectrum. Each light-collecting subassembly receives approximately one steradian of light energy from the light source. According to the disclosed embodiment of the invention, six light-collecting subassemblies are spaced around the light source so that most of the optical radiation emitted from the light source is received by the plural light-collecting subassemblies.

According to the invention, each light collecting subassembly comprises a collimating lens that collects light emitted from the light source. Each collimating lens provides a well defined light beam that is directed radially away from the light source, toward and onto a radially aligned dichroic mirror. Each dichroic mirror reflects primarily UV radiation emitted by the light source and transmits primarily all other light frequencies onto an adjacent portion of the housing defining a heat sink. Each dichroic mirror is disposed at an angle with respect to the radius of the light source so that UV radiation is reflected downwardly in a predefined direction within the housing. Preferably, the mirror is arranged at a 45° angle with respect to the radius of the light source (and hence, also at a 45° angle with respect to the longitudinal axis of the housing) thereby reflecting UV radiation downwardly in a path substantially parallel to the longitudinal axis of the housing. Thus, six parallel and equidistantly spaced beams of UV radiation are provided and shone downwardly within the housing.

Disposed in the path of each of the beams of UV radiation is a blocking filter that blocks passage of "short" UV radiation (below 290 nm). Disposed beneath each dichroic mirror is one end of a flexible liquid light guide into which UV radiation is directed. The opposite end of each light guide is movable and may be positioned to direct UV radiation onto a desired surface.

Positioned between the plural dichroic mirrors and the plural light guides is a shutter assembly. The shutter assembly passes UV radiation to all of the light guides when in a first position and blocks passage of UV radiation to all of the light guides when in a second position. A third position may also be provided to include a blocking filter for intercepting a portion of the spectral light at all positions within the simulator. Also positioned between each dichroic mirror and each light guide is a mechanical attenuator—a separate attenuator is associated with each subassembly. Each attenuator is individually adjustable between fully open and fully closed positions to permit individual regulation of the output intensity of each light guide.

The plural light collecting subassemblies, in combination with the shutter and individually adjustable attenuator assemblies, permit a user to provide plural selectively adjustable beams of UV radiation that are generated from a single light source, thus permitting various exposure settings to be provided.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Figure 1:
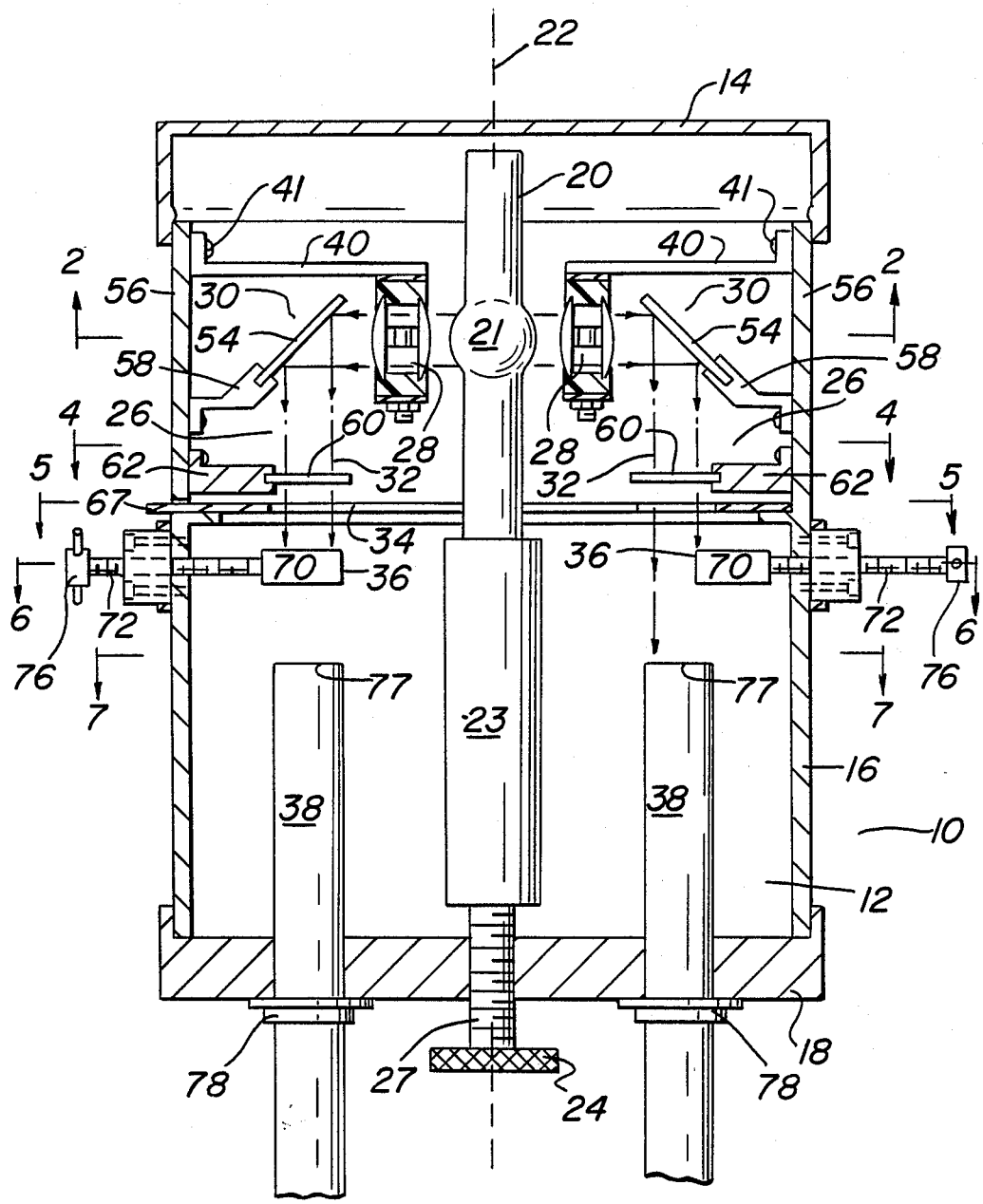
FIG. 1 is a cross sectional view of a solar simulator and illustrates the arrangement of two opposed light collecting subassemblies within a housing.

Referring now to the drawings wherein like numerals represent like elements, there is illustrated in FIG. 1 a solar simulator according to the present invention and labeled generally 10. Solar simulator 10 comprises an elongated cylindrical housing 12 having a cylindrical wall 16, an upper portion 14 and a lower portion 18. Upper portions 14 and 18 are removably secured to the cylindrical wall 16 by any suitable means such as press fit, screws, etc. Housing 12 is substantially light tight except as hereinafter described to allow the escape of light in a controlled manner.

Disposed along the central axis 22 and in the upper half of housing 12 is an artifical light source (lamp) 20 disposed in a lamp socket 23. Preferably lamp 20 is a xenon short arc lamp or such other high intensity lamp that emits a substantial amount of radiation in the UV spectrum. As shown, lamp 20 has a portion 21 which emits substantially more light than the remaining portions of lamp 20. The portion 21 is radially aligned with a plurality of light collecting subassemblies 26 that are hereinafter described. Lamp 20 is preferably adjustable in X and Y (radial) and Z (axial) directions for alignment with respect to the light collecting subassemblies 26. FIG. 1 illustrates a means including a knob 24 and a screw 27 threadingly engaging the bottom portion 18 for aligning the lamp 20 in the Z (axial) direction. Similar means for radial adjustment of the lamp (X and Y directions) may also be provided (not shown).

Figure 2:
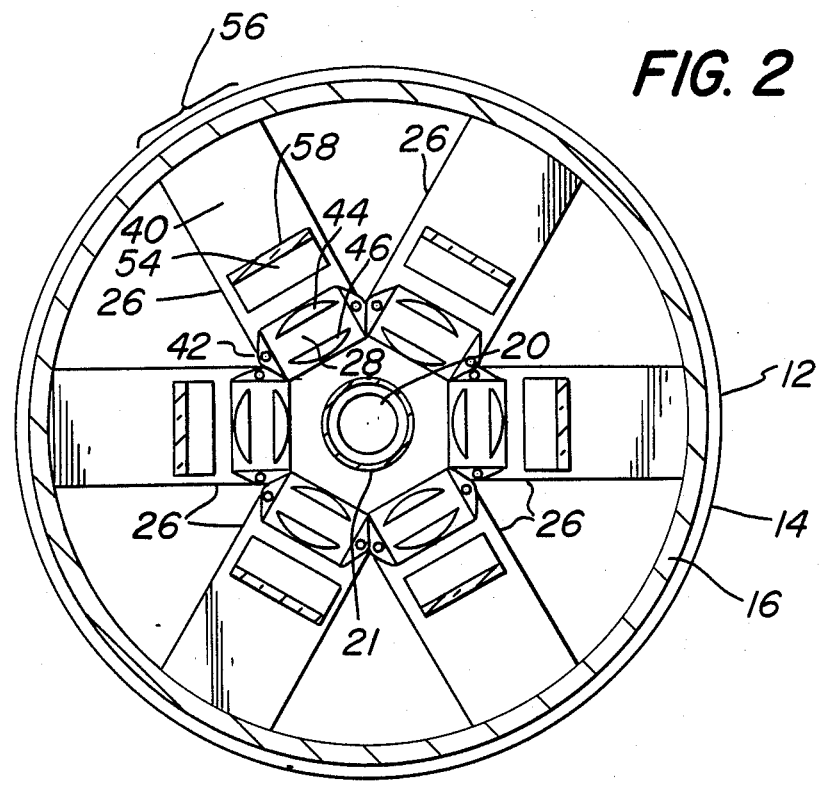
FIG. 2 is a cross sectional view taken along line 2—2 of FIG. 1.

A plurality of light collecting subassemblies 26 are equidistantly spaced radially from and around lamp 20 as best illustrated in FIGS. 1 and 2. As mentioned, each light collecting subassembly 26 has a portion radially aligned with portion 21 of lamp 20. The function of the light collecting subassemblies 26 is to receive optical radiation emitted from lamp 20 and provide a plurality of separate, individually and selectively adjustable beams of UV radiation.

According to the preferred embodiment of the invention disclosed herein, the solar simulator 10 comprises six light collecting subassemblies 26. Each light collecting subassembly 26 receives one steradian of radiation from lamp 20. Thus, most of the light emitted by lamp 20 is recovered by the six light collecting subassemblies 26. The inventive solar simulator is therefore able to emulate sunlight at much higher intensities than prior art simulators that use a parabolic or elliptical refector to collect light energy.

Each light collecting subassembly 26 is contemplated to be identically constructed; therefore, unless otherwise specified, only one light collecting subassembly will be described in detail, it being understood that each light collecting subassembly 26 is identical to that described.

Each light collecting subassembly 26 comprises a collimating lens assembly 28, a mirror assembly 30, a blocking filter assembly 32, an attenuator assembly 36 and a flexible liquid light guide 38. Associated with all of the light collecting subassemblies 26 is a shutter 34, as explained hereinafter.

Figure 3:
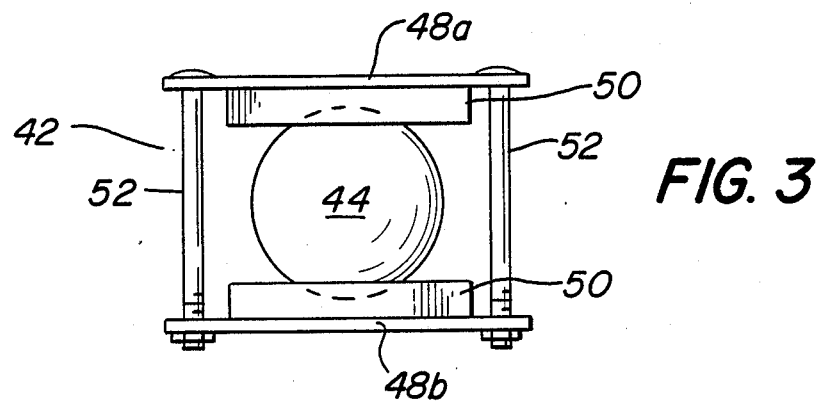
FIG. 3 is a side plan view of a lens holding assembly utilized in the solar simulator.

The function of collimating lens assembly 28 is to provide a well defined beam of light that is directed radially outward from lamp 20 toward mirror assembly 30. As shown in FIGS. 1 and 2, the plural collimating lens assemblies 28 are equidistantly spaced radially from and around lamp 20. In the embodiment illustrated, each collimating lens assembly 28 comprises a pair of opposed convex lenses 44, 46 (FIG. 2) supported by a lens holder 42 (FIG. 3) which in turn is supported in radial alignment with lamp 20 by means of mounting bracket 40 affixed to wall 16 by means of screw 41. However, each pair of lenses 44, 46 may be substituted with a single lens that performs the collimating function. Moreover, bracket 40 may be eliminated and the collimating lens may be supported, e.g., from a support that extends upwardly from lower portion 18 or in any other convenient manner as desired.

Lens holder 42 comprises a pair of opposed, spaced apart frame parts 48a, 48b that sandwich the lenses 44, 46. Frame parts 48a, 48b are maintained in spacial relationship by means of screws 52. TEFLON ® support pads 50 are provided on frame parts 48a, 48b for the purpose of safely retaining lenses 44, 46 between the opposing frame portions 48a, 48b.

Radially spaced from each collimating lens assembly 28 is a mirror assembly 30. As illustrated in FIG. 2, the plural mirror assemblies 30 are substantially equidistantly spaced from their respective collimating lens assembly 28. The function of mirror assembly 30 is to reflect vertically downward, in a path substantially parallel to axis 22, only a portion of the spectrum of the optical energy directed thereon by collimating lens 28, while transmitting all other portions of the spectrum. As best illustrated in FIG. 1, each mirror assembly 30 comprises a dichroic mirror 54 that is supported at a substantial 45° angle with respect to the radius of lamp 20 (and hence also with respect to the longitudinal axis 22) by means of mirror support 58 that is fixedly secured to wall 16. Dichroic mirror 54 reflects only UV radiation emitted by lamp 20, while transmitting all other light frequencies onto a portion 56 of wall 16 defining a heat sink. See FIGS. 1 and 2. Thus, primarily UV radiation is reflected vertically downward in a path substantially parallel to the axis 22. It will be appreciated that six parallel and equidistantly spaced beams of UV radiation are thus provided by the apparatus thus far described.

As illustrated, each dichroic mirror 54 extends to approximately the same height as each of its corresponding lenses 44, 46. However, in the event bracket 40 is deleted, as before described, it is preferred that each mirror 54 extend above the collimating lens so that the mirror directs air currents onto lamp 21.

Figure 4:
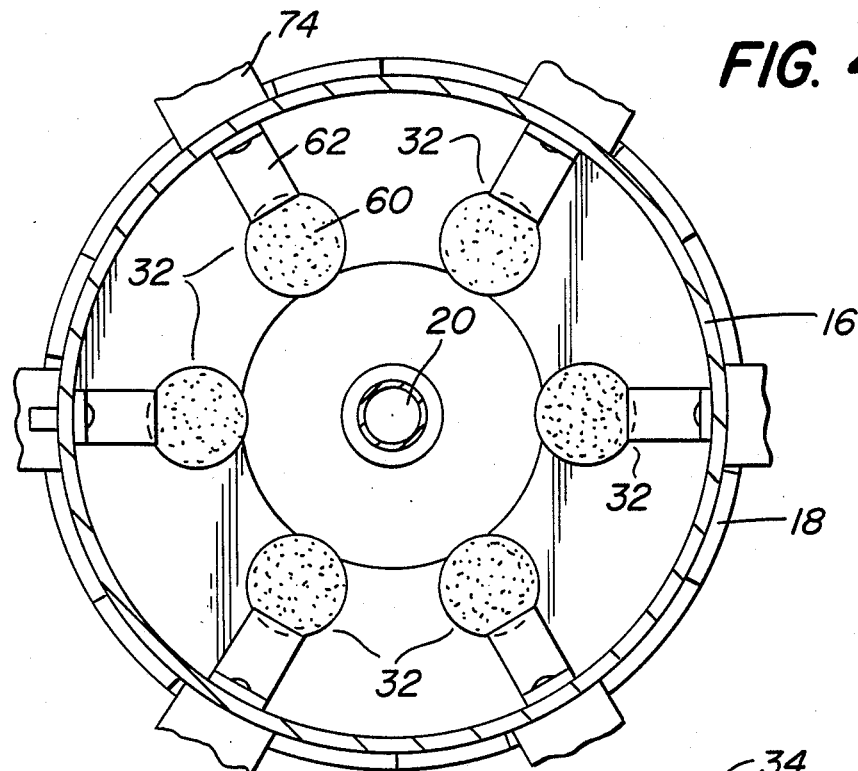
FIG. 4 is a cross sectional view taken along line 4—4 of FIG. 1.

Each of the beams of reflected UV radiation is directed toward a filter assembly 32. Each filter assembly 32 comprises a blocking filter 60 disposed in the path of the reflected light by means of a bracket 62 fixedly secured to wall 16. See FIGS. 1 and 4. Each of the filters 60 effectively "blocks" short UV radiation (below 290 nm). The filtered UV radiation is directed downwardly through a shutter assembly, attenuator assembly and into a liquid light guide, as hereinafter described. If desired, filter assembly 32 may be deleted and each blocking filter 60 may be integrated into its respective light guide 38, as will become evident hereinafter.

Figure 5:
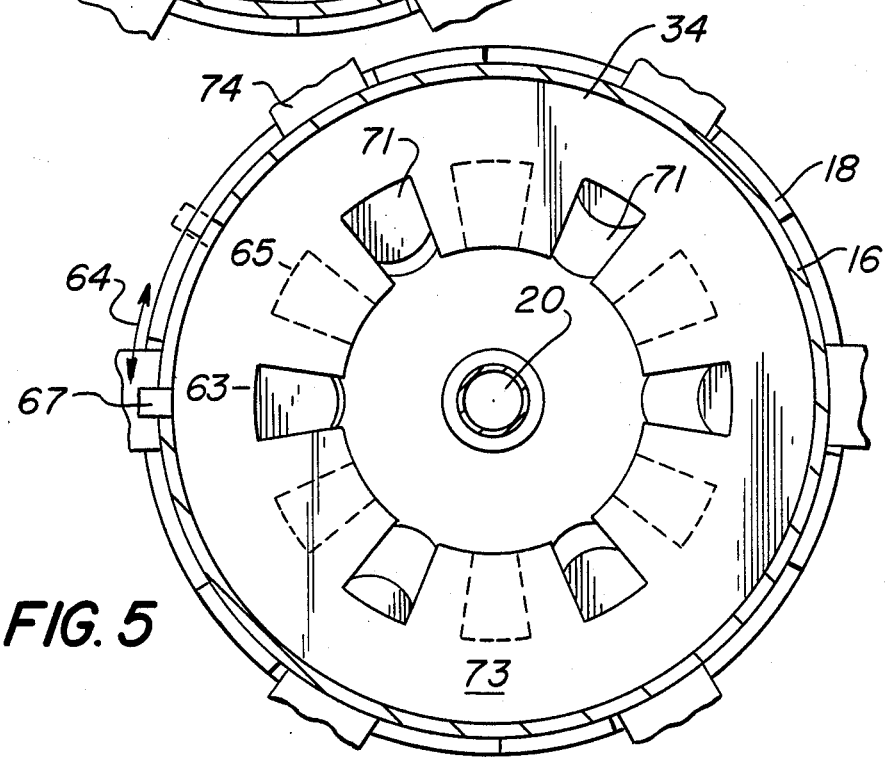
FIG. 5 is a cross sectional view taken along line 5—5 of FIG. 1.

Disposed beneath the plural filter assemblies 32 is a shutter assembly 34. See FIGS. 1 and 5. Shutter assembly 34 comprises a rotatable disk 73 having a plurality of equidistantly spaced apertures 71, as best shown in FIG. 5. The number of apertures 71 corresponds to the number of light collecting subassemblies 26 provided in the sunlight simulator 10. Disk 73 is rotatable by means of an integral tab 67 in the directions shown by arrow 64 between a first position 63, illustrated by the solid lines, and a second position 65, illustrated by the dotted lines. When disk 73 is rotated to its first position 63, all of the apertures 71 are in substantial axial alignment with their respective mirrors 54 and filters 60 thereby permitting filtered UV radiation to pass therethrough into light guides 38. On the other hand, when disk 73 has been rotated to the second position 65, the portions of disk 73 between adjacent apertures 71 block passage of UV radiation, thereby preventing any light from entering any of the light guides 38.

Figure 8:
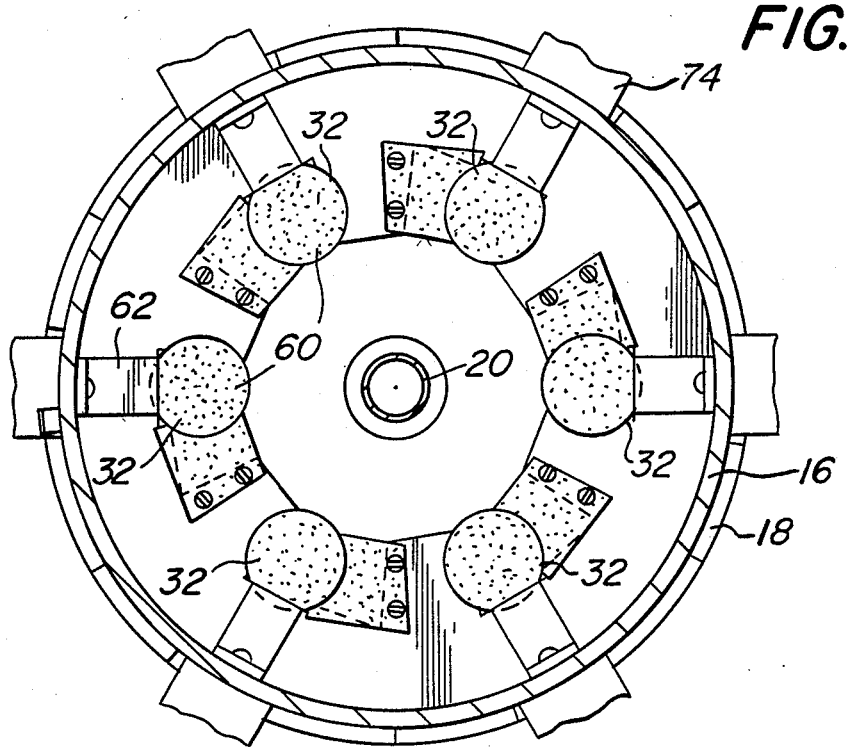
FIG. 8 is an alternate embodiment of the structure illustrated in FIG. 4.
Figure 9A:
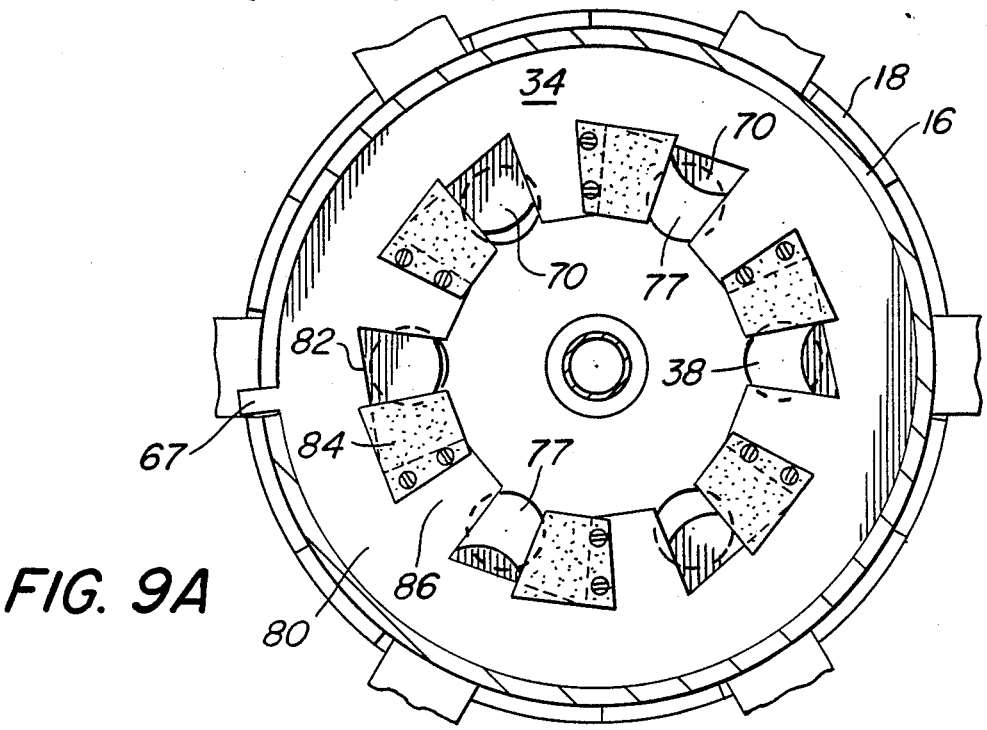
FIGS. 9a, 9b and 9c are alternate views of the embodiment illustrated in FIG. 8.

The embodiment illustrated in FIGS. 1 and 5 shows a shutter assembly having a rotatable disk 73 with two separate adjustment positions. These positions provide a fully on or a fully off setting in that they either permit all of the light and radiation to pass through the disk or block completely each beam 32 as it passes toward the liquid light guide 38. In FIGS. 8 and 9A14 C the shutter assembly 34 comprises a rotatable disk 80 having a plurality of equidistantly spaced occulting elements for blocking at least a portion of the light beam 32 passing towards the liquid light guide 38. The number of occulting elements corresponds specifically to the number of light collecting sub-assemblies 26 provided within the sunlight simulator 10. Each occulting element has three positions including an aperture 82, a blocking filter 84 and a blocking portion 86. The disk 80 is rotatable so that it may be set at any one of the three positions such that each one of the occulting elements may be moved in unison into position to effect the beam 32 in it passage towards the top 77 of the liquid light guide 38.

As illustrated in FIG. 9A, the aperture 82 permits all of the light beam 32 to pass towards the top 77 of the liquid light guide 38 in each of the sub-assemblies. Thus, the aperture 32 will permit all of the UV radiation to be directed towards the liquid light guide 38 or the individual attenuator assembly 36.

Figure 9B:
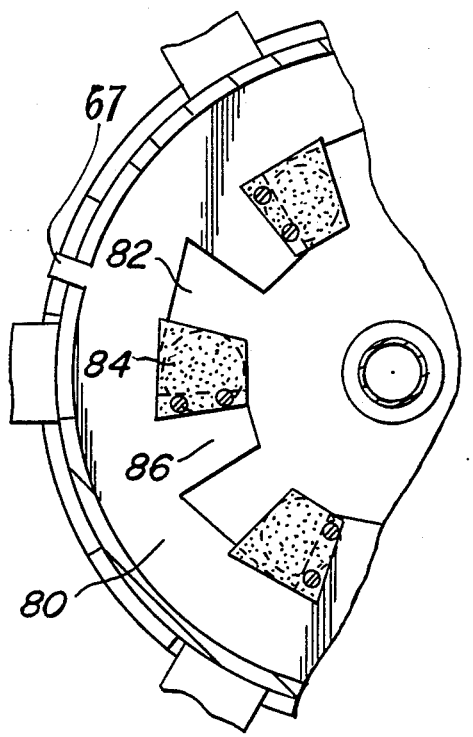

As illustrated in FIG. 9B, the disk 80 may also be rotated to an attenuator position by means of tab 67 so as to position the blocking filters 84 within the line of the beam 32. The blocking filters 84 act on each of the series of beams as a spectral absorption and reflection interceptor so as to block a portion of the light or UV radiation transmitted towards the top 77 of each liquid light guide 38.

Figure 9C:
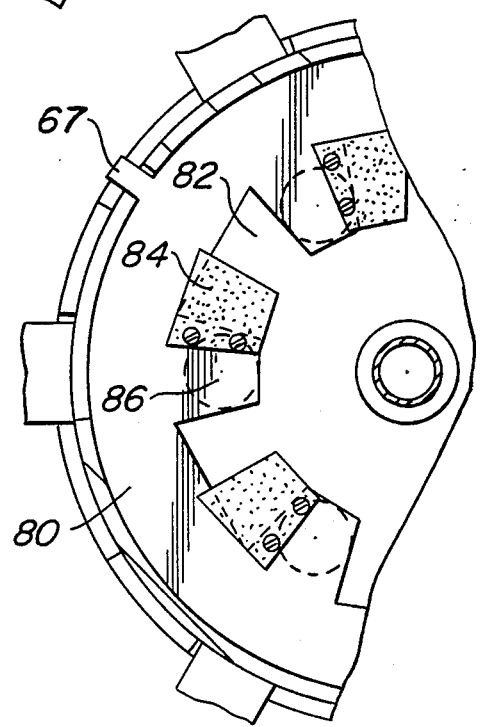

As illustrated in FIG. 9C, the disk 80 may also be rotated by means of tab 67 to another alternate position and moves the blocking portion 86 to fully block each light beam 32.

The embodiment for both the two-position disk 73 and a three-position disk 80 are contemplated for use as part of the shatter assembly 34. However, any number of positions may be utilized by altering the radial position of the liquid light guides and the appropriate light beam assemblies so as to permit the appropriate disk 73, 80 to be rotated in its appropriate numbered position depending on the radial position of the light beam 32 and the liquid light guides 38.

Figure 6:
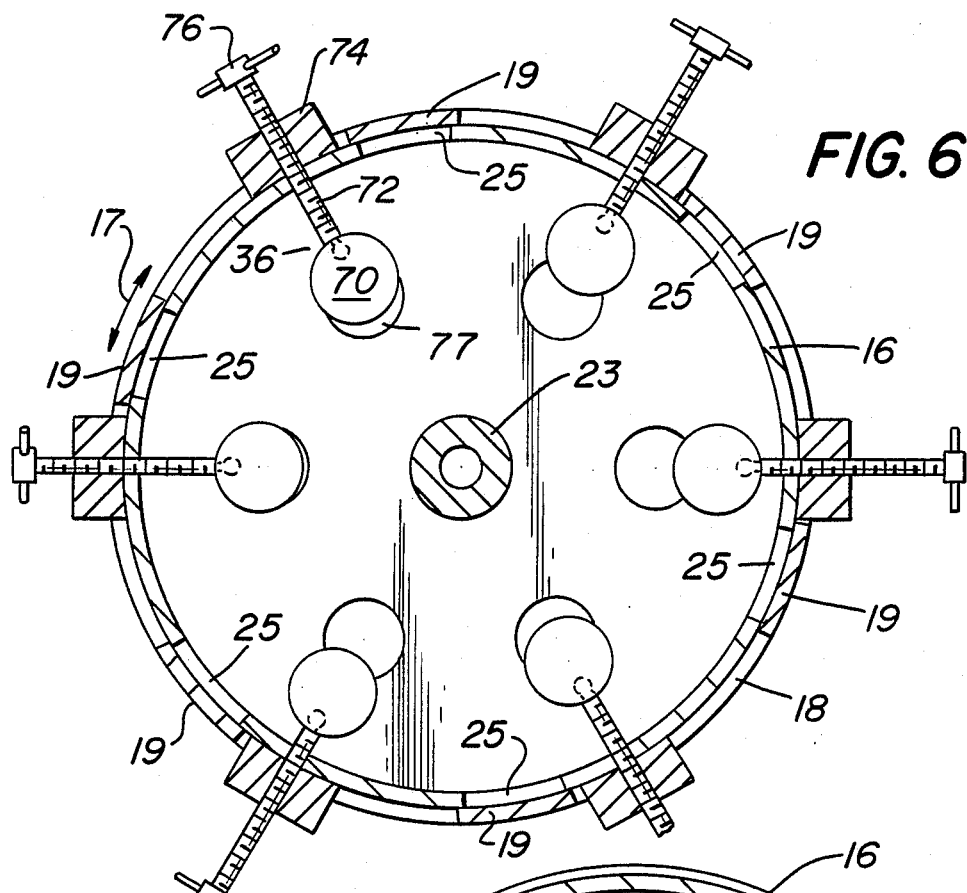
FIG. 6 is a cross sectional view taken along line 6—6 of FIG. 1.

As mentioned, each light collecting subassembly 26 is provided with an attenuator assembly 36 that permits regulation of the amount of radiation that is permitted to pass into its respective light guide 38. Thus, the output intensity of each light guide 38 is individually and selectively adjustable. Preferably, the attenuator assemblies 36 are disposed immediately beneath the shutter mechanism 34, as best illustrated in FIG. 1. As illustrated in FIG. 6, each attenuator assembly 36 comprises an attenuator 70 fixedly secured to a screw 72 threadingly engaging wall 16 and a mount 74. A handle 76 is disposed on the opposite end of screw 72. Rotation of handle 76 thus results in radial displacement of attenuator 70 so as to permit regulation of the amount of light that is permitted to pass into an input 77 of light guide 38. Those skilled in the art will appreciate that the amount of light that is provided at the output of each light guide 38 may be selectively adjusted by rotating handle 76. Thus, when shutter 34 is in the first position 63, the amount of light that is permitted to pass into each of the light guides 38 is individually and selectively adjustable by means of attenuator assemblies 36.

As also illustrated in FIG. 6, solar simulator 10 is preferably provided with a plurality of inspection holes 25 which are normally covered by inspection plates 19. Inspection plates 19 may be rotated in the directions shown by arrow 17 to either open or close the inspection holes 25. Normally, the inspection holes 25 are closed during operation of the device, but may be opened to permit internal inspection of the simulator 10.

Figure 7:
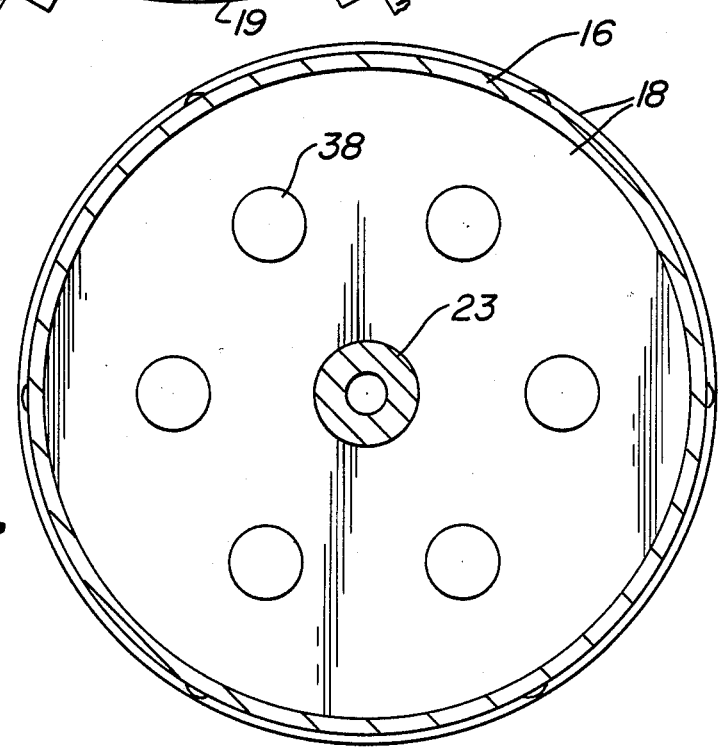
FIG. 7 is a cross sectional view taken along line 7—7 of FIG. 1.

Turning now to FIG. 7, there is shown a flexible liquid light guide 38 associated with each light collecting subassembly 26. Each light guide 38 is in substantial axial alignment with mirror 54 to receive UV radiation passing therethrough. As shown in FIG. 1, the light guides 38 extend through the bottom into the housing 12 to a location adjacent attenuators 70. Screw mount 78 fixedly secure the portion of the light guides 38 extending into the housing 12 to bottom portion 18. Ends 77 of light guides 38 thereby remain stationary with respect to attenuator 70 when opposite ends of flexible light guides 38 are moved about during an experiment. Each light guide 38 is preferably a well known liquid light guide wherein substantially most UV radiation that is directed into one end is emitted from the other. Any type of suitable light guide may be utilized in the practice of the present invention. As mentioned, the filter 60 may be incorporated into light guides 38, preferably at a location adjacent the output thereof.

The herein described sunlight simulator permits plural simultaneous experiments of varying intensity while utilizing only a single light source. The present invention may be embodied in other specific forms without departing from the spirit or essential attributes thereof and, accordingly, reference should be made to the appended claims, rather than to the foregoing specification, as indicating the scope of the invention.

I claim:

1. A sunlight simulator comprising:
   (a) a housing;
   (b) a lamp disposed interiorly of the housing;
   (c) light collecting means disposed around the lamp for receiving radiation emitted from the lamp and providing a plurality of beams of radiation each having only a selected portion of the spectrum of wave lengths of radiation emitted from the lamp;
   (d) light guide means having inputs and outputs for receiving each of the beams of radiation at the inputs and providing a plurality of adjustably positionable beams of radiation at the outputs thereof;
   (e) attenuator means disposed between the light collecting means and the light guide means for individually and selectively regulating the intensity of each of the beams of radiation appearing at the outputs of the light guide means; and
   (f) shutter means disposed between the light collecting means and the light guide means and movable between first and second positions for allowing all of the beams of radiation to pass therethrough when in the first position and blocking passage of all the beams of radiation when in the second position.

2. Sunlight simulator according to claim 1 wherein the shutter means further comprises blocking filter means for allowing only a portion of each beam to pass from the light collecting means towards the light guide means when such shutter means is in a third position.

3. Sunlight simulator according to claim 1 wherein the light collecting means comprises:
   (a) a plurality of collimating lenses equidistantly spaced radially from and around the lamp, each collimating lens directing a portion of the radiation emitted from the lamp radially outward therefrom;
   (b) a dichroic mirror associated with each collimating lens and in substantial radial alignment therewith, each dichroic mirror being disposed at an angle to reflect generally downward, toward a bottom of the housing, only UV radiation emitted by the lamp and transmit all other wavelengths of radiation onto a portion of the housing defining a heat sink;
(c) a blocking filter associated with each dichroic mirror and in the path of UV radiation reflected by the dichroic mirror for removing short UV radiation therefrom.

4. Sunlight simulator according to claim 3 wherein the angle of each dichroic mirror is approximately 45° with respect to the longitudinal axis of the housing so that each beam of UV radiation is directed substantially vertically downward in a path substantially parallel to the longitudinal axis thereby providing a plurality of substantially equidistantly spaced apart parallel beams of UV radiation within the housing.

5. Sunlight simulator according to claim 4 wherein the light guide means comprises a plurality of flexible liquid light guides equal in number to the number of beams of UV radiation, each flexible liquid light guide being in substantial axial alignment with a corresponding one of the downwardly directed beams of UV radiation.

6. Sunlight simulator according to claim 5 wherein the attenuator means comprises a plurality of individual attenuators equal in number to the number of beams of UV radiation, each attenuator being individually adjustable in a radial direction to selectively restrict the amount of radiation permitted to pass into the input of a light guide.

7. Sunlight simulator according to claim 6 wherein the shutter means comprises a disk rotatable between first and second positions and disposed between the plurality of dichroic mirrors and the plurality of liquid light guide inputs, the disk having a plurality of openings therethrough defining shutter apertures equal in number to the number of beams of UV radiation, each shutter aperture being in substantial axial alignment with a corresponding one of the beams of UV radiation when in a first position and thereby permitting radiation to pass therethrough, but being out of axial alignment when in the second position thereby blocking passage of radiation.

8. Sunlight simulator according to claim 3 wherein the number of collimating lenses, dichroic mirrors and blocking filters is six, each collimating lens, dichroic mirror and blocking filter thereby receiving approximately one steradian of radiation emitted from the lamp.

9. A sunlight simulator comprising:
(a) a generally elongated housing;
(b) a lamp disposed interiorly of the housing and along the longitudinal axis thereof;
(c) a plurality of light collecting sub-assemblies equidistantly spaced radially from and around the lamp, each light collecting sub-assembly comprising:
  (i) means for collimating and directing generally radially outward a portion of the radiation emitted from the lamp;
  (ii) second means in radial alignment with the first means for directing generally downward only a portion of the spectrum of wave lengths of radiation emitted from the lamp;
  (iii) third means receiving the downwardly directed radiation provided by the second means for flexibly guiding the portion of the radiation received thereby to a desired location;
  (iv) fourth means disposed between the second means and the third means for adjustably regulating the amount of radiation permitted to pass to the third means; and
  (v) fifth means associated with all of the light collecting sub-assemblies and disposed between the second and third means of each light collecting sub-assembly and movable between first and second positions for permitting radiation to pass from each of the second means to each of the third means when in the first position, and blocking passage of radiation when in the second position.

10. Sunlight simulator according to claim 9 wherein the fifth means is movable to a third position and further comprises blocking filter means for allowing only a portion of the radiation from each light beam to pass from each of the second means to each of the third means when in the third position.

11. Sunlight simulator according to claim 9 wherein the number of light collecting subassemblies spaced around the lamp is six, each light collecting subassembly receiving approximately one steradian of radiation emitted from the lamp.

12. Sunlight simulator according to claim 11 wherein the first means comprises a collimating lens.

13. Sunlight simulator according to claim 12 wherein the second means comprises a dichroic mirror arranged at an angle with respect to the longitudinal axis of the housing.

14. Sunlight simulator according to claim 13 wherein the third means comprises a flexible liquid light guide.

15. Sunlight simulator according to claim 14 wherein the fourth means comprises an attenuator adjustable in a radial direction to selectively restrict the amount of light that may pass into each light guide.

16. Sunlight simulator according to claim 15 wherein the fifth means comprises a disk rotatable between first and second positions, the disk having six openings therethrough that are equidistantly spaced radially from and around the center of the disk and collectively defining shutter apertures, each shutter aperture being in substantial alignment with a corresponding light guide to permit radiation to pass therethrough when in the first position, but being out of alignment when in the second position to block the passage of radiation.

17. Sunlight simulator according to claim 16 wherein the dichroic mirror reflects UV radiation only and transmits all other wavelengths of radiation onto a portion of the housing defining a heat sink, further comprising a blocking filter in the path of the reflected UV radiation for removing short UV radiation therefrom.

18. Sunlight simulator according to claim 17 wherein the angle of the dichroic mirror is 45° with respect to the longitudinal axis of the housing so that UV radiation is reflected vertically downward in a path substantially parallel to the longitudinal axis of the housing thereby providing six substantially parallel and equidistantly spaced beams of UV radiation within the housing.

19. Sunlight simulator comprising:
(a) a generally elongated cylindrical housing;
(b) a lamp disposed interiorly of the housing and along the longitudinal axis thereof and being of a type that emits a substantial amount of radiation in the UV portion of the spectrum;
(c) six light collecting subassemblies equidistantly spaced radially from and around the lamp, each light collecting subassembly comprising:

(i) a collimating lens for collimating and directing generally radially outward from the lamp a portion of the radiation emitted from the lamp;

(ii) a dichroic mirror radially spaced from the collimating lens and receiving the portion of the radiation directed radially outward thereby, the dichroic mirror being disposed at a substantial 45° angle with respect to the longitudinal axis of the housing and reflecting only UV radiation emitted from the lamp vertically downward in a path substantially parallel to the longitudinal axis of the housing and transmitting all other wavelengths of radiation emitted from the lamp onto a portion of the housing defining a heat sink;

(iii) a blocking filter in the path of the reflected UV radiation for removing short UV radiation therefrom;

(iv) a flexible liquid light guide having one end defining an input disposed beneath the dichroic mirror and in substantial axial alignment therewith for receiving UV radiation, a portion of the light guide being fixedly secured to the housing;

(v) an attenuator disposed between the dichroic mirror and the input to the flexible liquid light guide and being adjustable in a radial direction to restrict the downwardly directed radiation and thereby regulate the amount of UV radiation permitted to pass through to the input of the flexible liquid light guide;

(d) a shutter associated with all of the light collecting subassemblies and disposed between each of the dichroic mirrors and each of the liquid light guide inputs and comprising a disk rotatable between at least a first and second position, the disk having six openings defining shutter apertures, the shutter apertures being equidistantly spaced radially from and around the center of the disk, each shutter aperture being in substantial axial alignment with a corresponding liquid light guide input when the disk is in the first position thereby allowing UV radiation to pass therethrough, and being out of axial alignment when the disk is in the second position thereby blocking passage of UV radiation; and (e) a plurality of openings equidistantly spaced around a side wall of the housing and defining inspection holes normally covered by a plurality of retractable inspection plates.

* * * * *